United States Patent [19]

Lachmitz

[11] Patent Number: 4,621,181
[45] Date of Patent: Nov. 4, 1986

[54] METHOD OF MANUFACTURING MULTILAYER SCREW SEAM PIPES AND DEVICE FOR CARRYING OUT THE METHOD

[75] Inventor: Horst Lachmitz, Unna, Fed. Rep. of Germany

[73] Assignee: Hoesch AG, Fed. Rep. of Germany

[21] Appl. No.: 639,326

[22] Filed: Aug. 10, 1984

[30] Foreign Application Priority Data

Aug. 30, 1983 [DE] Fed. Rep. of Germany ....... 3331144

[51] Int. Cl.$^4$ .......................... B23K 31/06; B23K 9/02
[52] U.S. Cl. ....................................... 219/62; 219/61.6
[58] Field of Search ....................... 219/60 R, 61, 61.6, 219/62

[56] References Cited

U.S. PATENT DOCUMENTS 3,735,478  5/1973  Porter et al. ...................... 219/62 X
4,247,033  1/1981  Dahmen et al. ................... 219/62 X

FOREIGN PATENT DOCUMENTS 1340245  12/1973  United Kingdom ................. 219/62

Primary Examiner—Clarence L. Albritton
Assistant Examiner—C. M. Sigda
Attorney, Agent, or Firm—Eric P. Schellin

[57] ABSTRACT

An improved method of manufacturing multilayer helical seam pipes from strips or bands lying loosely over each other to prevent porous welding seams due to heated air escaping from resultant gaps between the layers of strips, comprising feeding the strips to a deformation station at an angle of entry corresponding to the pipe diameter, arc welding seams of the band edges with several arc welding heads, and arc welding a seam to the inside contact points of the area containing the band seams with another welding head to connect the adjacent bands.

3 Claims, 3 Drawing Figures ized with each other, and which are fed to a deformation station at an angle of entry which corresponds to the particular pipe diameter and then welded together into a pipe length or string which is subsequently divided into individual pipes, as well as to a device for carrying out the method.

METHOD OF MANUFACTURING MULTILAYER SCREW SEAM PIPES AND DEVICE FOR CARRYING OUT THE METHOD

The invention relates to a method of manufacturing multilayer helically wound or screw seam pipes from several strips or bands lying loosely over each other which are individually unrolled and straightened, the strips or band edges of which are conjointly worked to a width which is as great as possible and coordinated with each other, and which are fed to a deformation station at an angle of entry which corresponds to the particular pipe diameter and then welded together into a pipe length or string which is subsequently divided into individual pipes, as well as to a device for carrying out the method.

A method of this type is known from DE-AS No. 27 45 389 and finds its counterpart in issued Canadian Pat. No. 1,117,749, or U.S. Pat. No. 4,247,033 which is herein incorporated by reference.

When multilayer screw seam pipes are manufactured from several bands lying loosely over each other, air gaps arise between the layers as a result of the tolerances of the band thicknesses. Such air gaps adversely affect the pipe welding if a part of the heated air in the air gaps escapes via the liquid pipe welding seam. The result is a porous pipe welding seam with diminished strength.

THE INVENTION

The invention therefore has the task of disclosing a method of manufacturing multilayer helically wound or screw seam pipes from several bands lying loosely over each other of the type initially mentioned and a device for carrying out the method which avoid an adverse effect on pipe welding by any air gaps that may be between the interface points between the layers.

The invention solves this task as follows: All adjacent band edges are connected by arc welding during the band deformation.

The device of the invention for carrying out the method contains several arc welding heads for welding the interface points between adjacent band edges.

The invention is described below in more detail with reference made to the drawings, which schematically show an embodiment of the invention.

BRIEF DESCRIPTION OF THE INVENTION

DETAILED DESCRIPTION OF THE INVENTION

Figure 1:
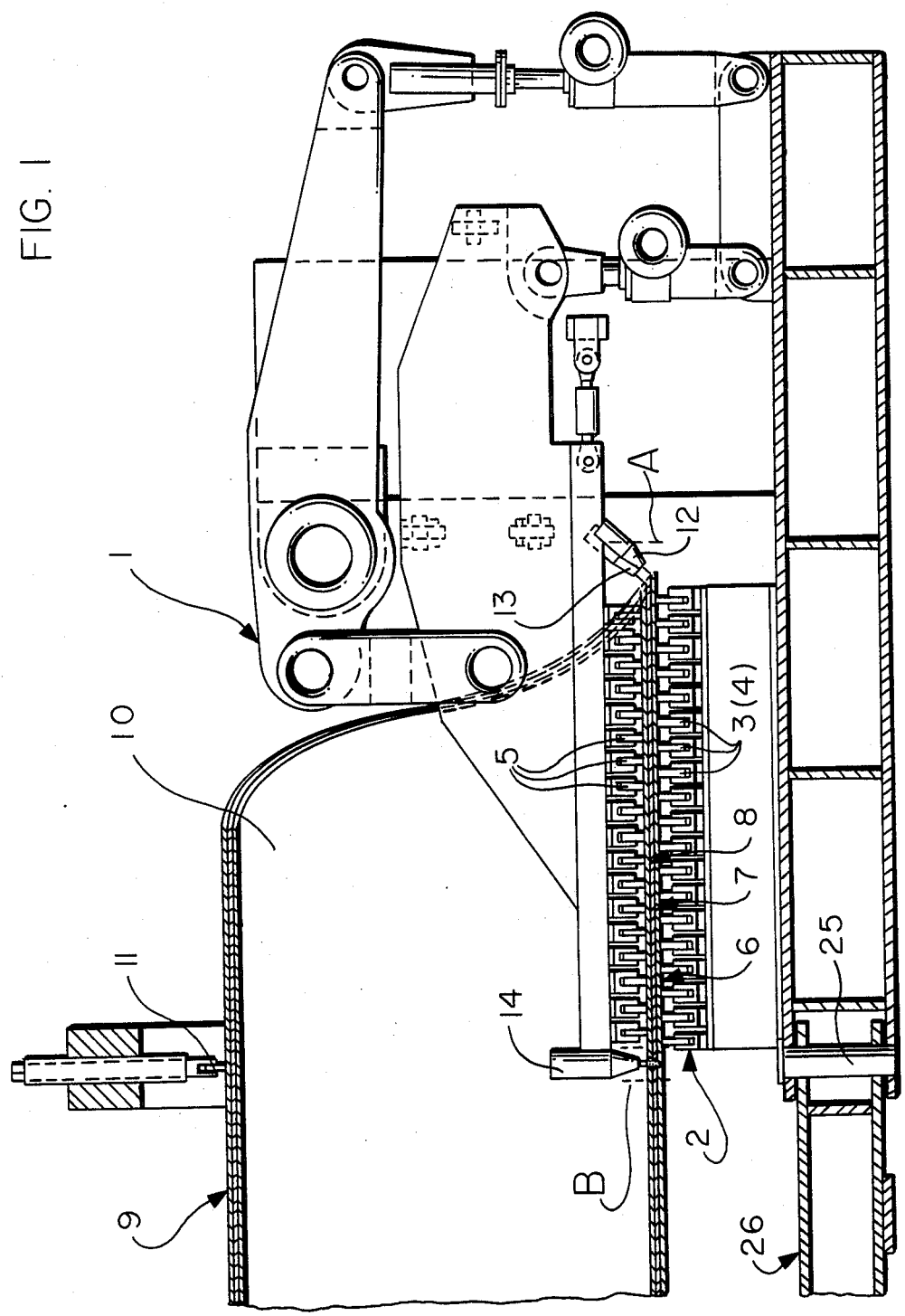
FIG. 1 shows a longitudinal section of a deformation station with a section therethrough at the start of the formation of the pipe.

Deformation station 1 has three-cylinder bending system 2 equipped with a plurality of adjustable bend band rollers 3,4,5.

Three continuously entering steel bands 6, 7, 8 are formed between band rollers 3, 4, 5 into a three-layer screw seam pipe 9.

Several guide rollers 11 are positioned for guiding pipe start 10.

Deformation station 1 is equipped with three arc welding heads 12, 13 and 14 each of which produces weld seams 15, 16 and 17 during the deformation of steel bands 6, 7, 8.

Figure 2:
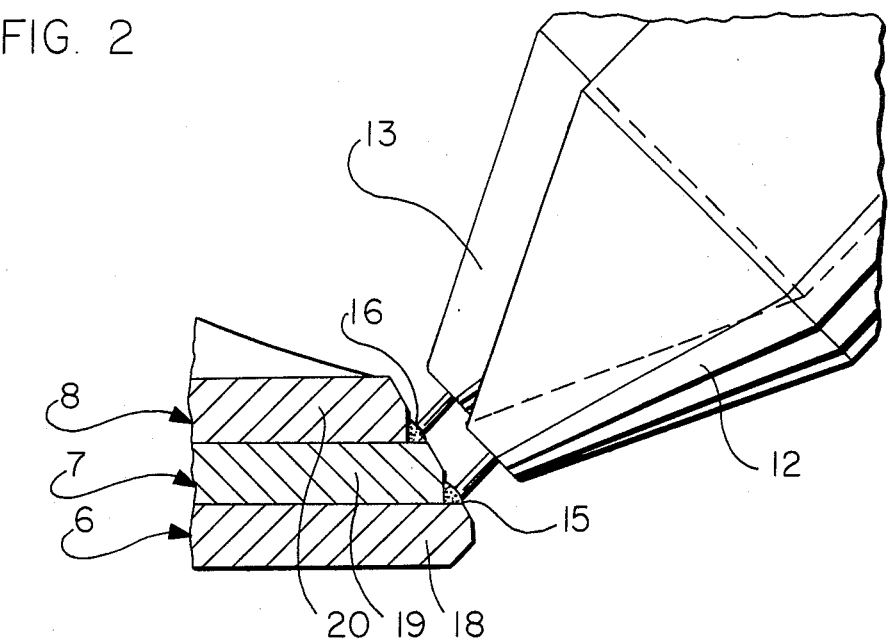
FIG. 2 shows part "A" of FIG. 1 on an enlarged scale.

Weld seam 15 connects lower and middle adjacent band edges 18, 19 and weld seam 16 connects middle and upper adjacent band edges 19, 20. FIG. 2 shows several arc welding heads placing welds 15 and 16 at the interfaces between layers.

Weld seam 17 represents a connection of adjacent band edges 21, 22 and 23 to edge 24 of pipe start 10.

Pipe exit frame 26, which can pivot about axle 25, is used to control the weld gap between edge 24 and band edge 21.

Figure 3:
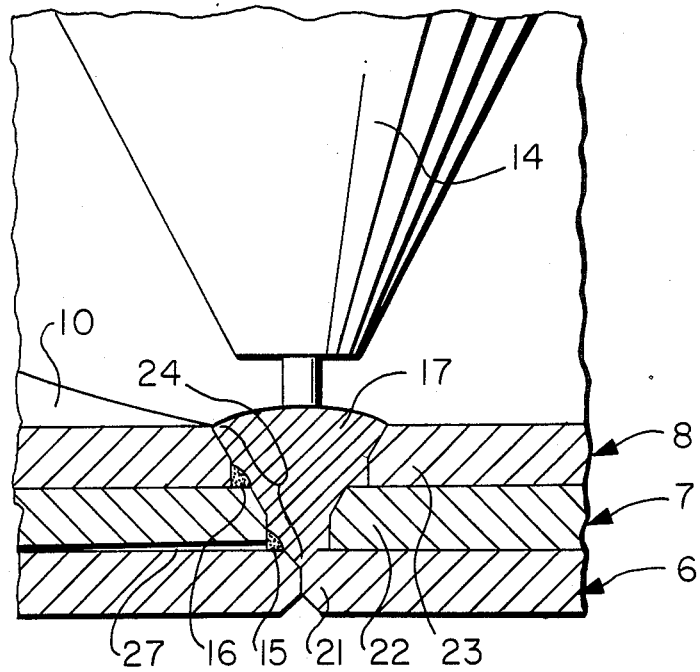
FIG. 3 shows part "B" of FIG. 1 on an enlarged scale.

When weld seam 17 is laid over welded interface points 15 and 16 by arc welding head 14, the air in air gap 27 (FIG. 3) is heated. However, this does not adversely effect the pipe welding, since the previously laid weld seam 15 prevents a penetration of the heated air in the direction of weld seam 17.

Adjacent band edges 21, 22 and 22, 23 can also be connected by laying two weld seams (not shown). In this instance, the weld seam which connects adjacent band edges 21, 22 is advantageously laid as a binding seam up to edge 24.

The final welding is then performed at separate final welding stands outside of deformation station 1.

What is claimed is:

1. In a method of manufacturing multilayer helical seam pipes in a deformation station from several elongated strips forming upper middle and lower strip edges lying loosely over each other individually unrolled and straightened, wherein the strip edges are conjointly worked to a width and coordinated with each other, and which are fed to a deformation station at an angle of entry which corresponds to the particular pipe diameter and then welded together to a pipe string, the improvement which avoids porous welding seams, comprising feeding the strips to a deformation station at an angle of entry corresponding to the pipe diameter, arc welding separate seams at interfaces of the upper and middle strip edges, and the middle and lower strip edges with several arc welding heads, and arc welding a seam over welded interface points with another arc welding head to connect adjacent strips.

2. The method of claim 1, wherein the deformation station is characterized by several arc welding heads for arc welding the interfaces between layers, and another arc welding head for arc welding a seam over the welded interface points to connect adjacent strips.

3. The method of claim 1, wherein said several arc welding heads are two arc welding heads.

* * * * *